Figure 7:
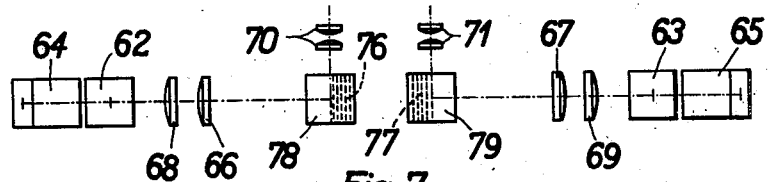

Feb. 23, 1932.   O. EPPENSTEIN   1,846,854
INSTRUMENT FOR FINDING THE RANGE DIFFERENCE OF TWO AIMING POINTS
Filed July 31, 1930   2 Sheets-Sheet 1
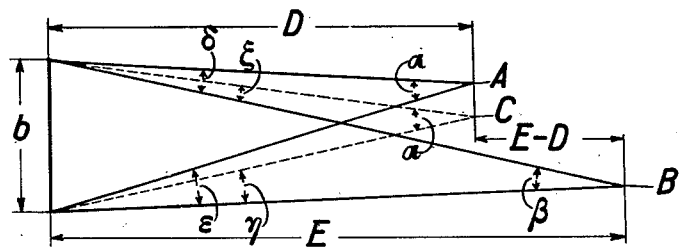
Fig. 1
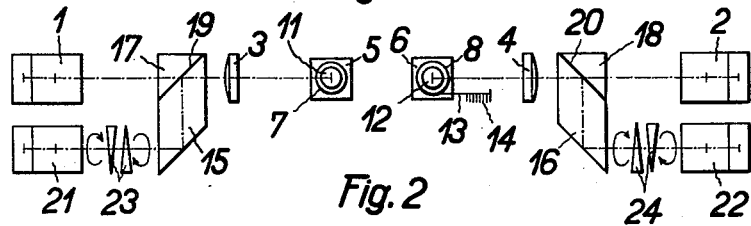
Fig. 2
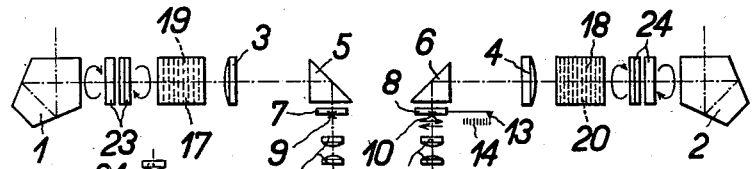
Fig. 3
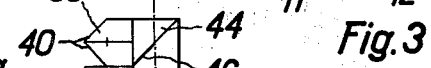
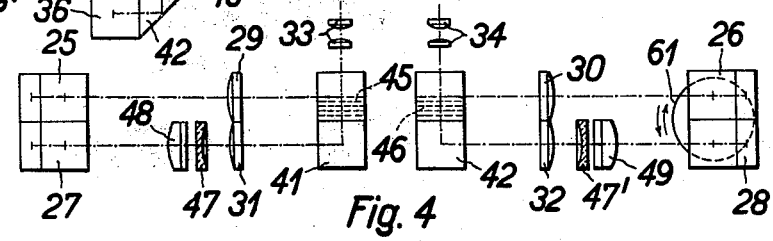
Fig. 4
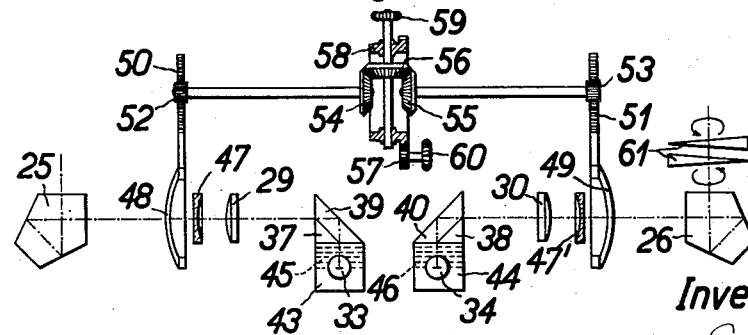
Fig. 5
Inventor:
Otto Eppenstein Feb. 23, 1932.   O. EPPENSTEIN   1,846,854
INSTRUMENT FOR FINDING THE RANGE DIFFERENCE OF TWO AIMING POINTS
Filed July 31, 1930   2 Sheets-Sheet 2

Inventor:
Otto Eppenstein

Patented Feb. 23, 1932

1,846,854

UNITED STATES PATENT OFFICE

OTTO EPPENSTEIN, OF JENA, GERMANY, ASSIGNOR TO FIRM CARL ZEISS, OF JENA, GERMANY

INSTRUMENT FOR FINDING THE RANGE DIFFERENCE OF TWO AIMING POINTS

Application filed July 31, 1930, Serial No. 472,121, and in Germany August 7, 1929.

The object of the present invention is an instrument for finding relatively to the place of the said instrument the range difference of two aiming points. This instrument makes use of a method consisting therein that a double telescope affords the observer to see in the field of view spatial images of the two aiming points simultaneously and that he finds the range difference of these aiming points by reducing to zero the distance between the two images. In other words, the method concerns stereoscopic rangefinding whereby the spatial image of one of the aiming points may be regarded as a measuring mark for the other aiming point and whereby the distance of the first mentioned aiming point from the instrument naturally must be known.

An instrument according to the invention may therefore consist of a stereoscopic rangefinder equipped with optical systems adapted to receive four systems of imaging ray pencils, whereof those optical systems that belong to two each of the ray pencil systems have no essential base difference at the rangefinder and lead the respective ray pencil systems to the image plane of the same eyepiece. The two aiming points and their surroundings may be imaged in the well-known manner in such a way that their images cover each other in the whole field of view of the rangefinder, or the field of view may be horizontally or vertically divided, each half of the field of view showing one of the two images, and one of the images may be horizontally, vertically or completely inverted. From what is said above it follows that a great number of differently constructed optical systems may be used. Other constructions base on the fact that the systems of imaging ray pencils belonging to each of the eyepieces may converge either in front or behind the objectives of the telescope systems of the rangefinder in such a manner that the rangefinder must have either two or four objectives. Of course, it is just as possible to use two differently constructed telescope systems or to have the rays converged between the single members of objective systems of several members. Finally, owing to the requirement of using of one aiming point a pseudoscopic instead of the usual orthoscopic image, the construction of the optical systems may have a further variation.

Rangefinders of the above description are adapted to measure range differences when they are provided with movable optical means for the apparent transformation of the parallactic angle of the one aiming point into that of the other. For this reason at least those systems of imaging ray pencils that belong to one of the eyepieces must be independent from each other as regards direction, i. e. the relative direction of these two systems must allow of being altered at will. The movement that the optical means must be given to produce the said alteration is a measure for the range difference of the two aiming points.

Stereoscopic rangefinders are generally so constructed that, in addition to the spatial image of one aiming point and its surroundings, they offer the observer in the field of view at the same time or several spatial mark images whose apparent distance is known. For measuring range differences with the new instrument such marks can be dispensed with as soon as the distance between the instrument and at least the one aiming point is given. To allow for the instrument more manifold an application and to prevent the necessity of determining by another apparatus the distance of one aiming point, it will be desired to provide such marks also in the new instrument, so that not only the range difference of the aiming points but also at least the distance which one of them has from the instrument can be read off direct. It is also advisable to improve the instrument by means of a further measuring device which serves for determining the angle that, relatively to the point where the rangefinder is mounted, corresponds to the difference in the directions of the two aiming points.

Figure 8:
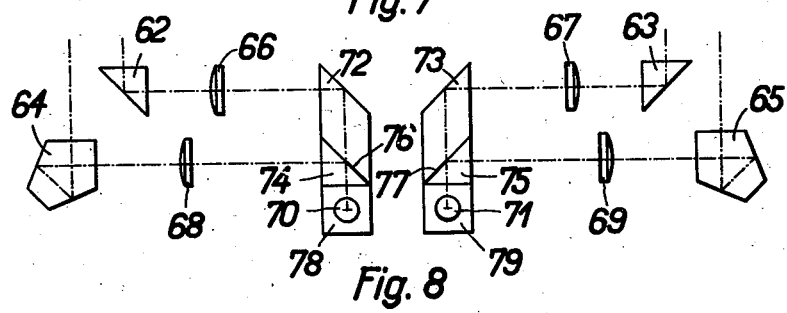
Figure 9:
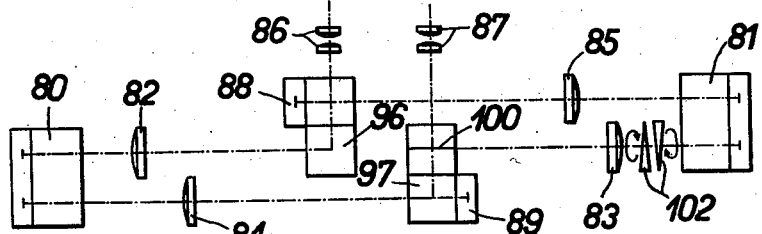
Figure 10:
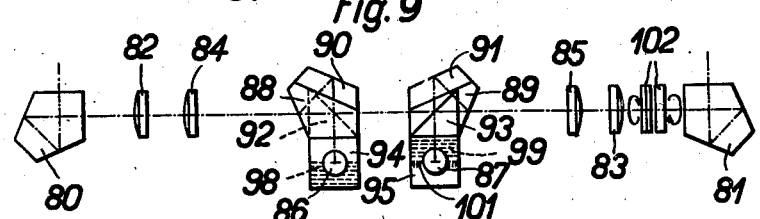
Figures 11, 12:
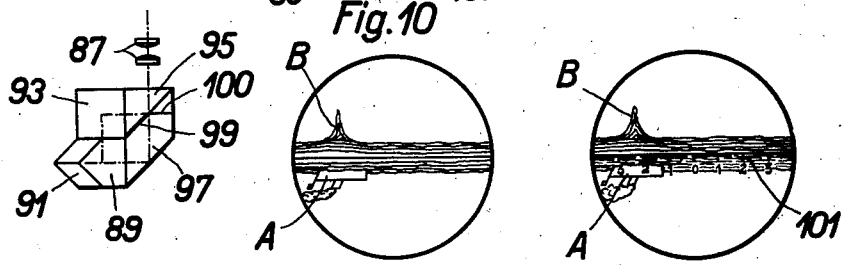

In the accompanying drawings are schematically represented by Figure 1 the measuring process and by Figures 2 to 12 four constructional examples of the invention. The first constructional example is illustrated in Figure 2 in a longitudinal section and in Figure 3 in a cross section. The second example is illustrated by Figure 4 which shows a longitudinal section of the optical parts, by Figure 5 which shows a cross section and also mechanical parts, and by Figure 6 which shows a lateral section of a single part. Figures 7 and 8 represent a longitudinal and, respectively, a cross section of the third example and Figures 9 and 10 a longitudinal and, respectively, a cross section of the fourth example. Figure 11 illustrates in a lateral section a single part of the fourth example and Figure 12 the image presented to the observer in the eyepieces.

In Fig. 1 the two aiming points are designated A and B, the appertaining parallactic angles $\alpha$ and $\beta$, and the base of the rangefinder $b$. Provided that the system axes of the imaging ray pencils emanating from the aiming points A and B deviate but slightly from a line perpendicular to the base $b$, and the parallactic angles $\alpha$ and $\beta$ are small, the following approximate relations hold good for the distances D and E of the two aiming points from the point on which the instrument is mounted:

(1) $D = \dfrac{b}{\alpha}$ (2) $E = \dfrac{b}{\beta}$ (3) $\alpha - \beta = b\left(\dfrac{1}{D} - \dfrac{1}{E}\right) = b\left(\dfrac{E-D}{ED}\right)$.

Further, if $\delta$ and $\epsilon$ represent the differences in the directions of the axes of two systems of imaging ray pencils that emanate from the two aiming points A and B arrive at the same side of the base $b$, then holds good also equation.

(4) $\alpha - \beta = \epsilon - \delta$.

By turning the axes of the systems of imaging ray pencils emanating from one aiming point, B for instance, until the parallactic angle $\beta$ has the same value as $\alpha$, the point B seems to be displaced to a point C, that is to say, the said point B is now displaced by the distance D from the point on which the rangefinder stands. The resulting turning angles of the system axes being designated $\eta$ and $\xi$, the following equation is arrived at:

(5) $\eta - \xi = \alpha - \beta = \epsilon - \delta$.

From the Equations (3) and (5) can be deduced:

(6) $\eta - \xi = b\dfrac{E-D}{ED}$.

When, relatively to the distance from the point on which the instrument stands, the range difference of the two aiming points A and B is not great, the sought range difference E—D is found approximately by means of the equation (7) $E - D = \dfrac{D^2}{b}(\eta - \xi)$ whereby the distance D is supposed to be known.

The first example (Figs. 2 and 3) shows a complete stereoscopic rangefinder. This rangefinder consists of two objective prisms 1, 2 of pentagonal cross section, two objectives 3, 4, two eyepiece prisms, 5, 6, of triangular cross section, two mark plates, 7, 8, which are disposed in the image plane of the objectives and have two measuring marks 9 and 10, respectively, and two two-lens eyepieces 11, 12. The mark plate 7 belonging to the left eyepiece, 11, is fixedly provided, while the mark plate 8 belonging to the right eyepiece, 12, is displaceable parallel to the rangefinder base and provided with an index 13 to which belongs a scale graduated to represent distances, 14. In front of the objectives 3, 4 are disposed in the ray paths prisms 15, 16 of trapeziform cross section which are cemented to triangular prisms 17, 18 and have their cemented surfaces 19, 20 half-transparently silvered. The path of the imaging rays of the rangefinder is not influenced by the prism bodies 15, 17 and 16, 18. However, the objectives 3, 4 are passed by two further systems of imaging ray pencils which are received by two eyepiece prisms of pentagonal cross section, 21, 22. Between these prisms, 21, 22 and the prisms 15, 16 are disposed compensators 23, 24 each of which consists of a pair of prisms that allow of being oppositely turned.

The first example bases on the well-known rangefinding method according to which the images are made to cover each other. When using the rangefinder according to the first example, each of the fields of view of the eyepieces shows two images of the viewed area covering each other, i. e. images of the two aiming points and their surroundings. The two images, which correspond to the ray pencils entering the prisms 21, 22, are displaced in the fields of view by turning in the same sense both compensators 23 and 24, so that the image of one of the aiming points (B) is given such a position relatively to the image of the other aiming point (A), which belongs to the ray pencil entering the prisms 1, 2, that both can be stereoscopically compared as to their distances. By turning the compensators 23 and 24 in a reverse sense, or, which comes up to the same, by turning only one of the two compensators 23 and 24, the range difference of the two images is reduced to zero, whereby the turning movement is a measure for the sought range difference (E—D). If the deviations of the axes of the entering systems of imaging ray pencils, which are caused by the two compensators 23, 24 together, are $\eta$ and $\xi$, the range difference E—D will, according to the above Equation (7), equal the value $$\frac{D^2}{b}(\eta-\xi).$$

In case the distance D of the aiming point A is not known, it is determined by means of the measuring marks 9 and 10. This distance is indicated by the index 13 on the correspondingly graduated scale 14 when the mark plate 8 is displaced so far from that position in which the image created by stereoscopically uniting the mark images 9 and 10 seems to lie at an infinite distance until it seems to lie at the same distance as the aiming point A.

Provided that the instrument is equipped with a corresponding device, the distances D naturally can be measured also by using a number of fixed stereoscopic marks or by displacing the images of the aiming point A into the apparent distance of a fixed steoreoscopic mark by means of a wedge displaceable in the path of the imaging rays and along the rangefinder base $b$ or by a further pair of rotatable wedges.

In the second example (Figs. 4 to 6) the fields of view of the eyepieces are divided by a horizontal separating line. The image appearing above is vertically inverted. The apparatus is equipped with two pairs of objective prisms of pentagonal cross section, 25, 26, and 27, 28, which lie one above the other and have in front two pairs of equal objectives, 29, 30, and 31, 32, and a pair of two-lens eyepieces 33, 34 allowing to be looked in from above. For combining the systems of imaging ray pencils entering the prisms 25 and 27 and, respectively, 26 and 28, and for simultaneously deviating them in the direction of the eyepiece axes, serve prism bodies whereof the one belonging to the eyepiece on the right side is represented in the drawings in a lateral section (Fig. 6). These prism bodies consist of lower triangular prisms 35 and 36, respectively, upper triangular prisms 37 and 38, respectively, having reflecting roof surfaces 39 and 40, respectively, prisms 41 and 42, respectively, of trapeziform cross section, and triangular prisms 43 and 44, respectively. The cemented surfaces 45 and 46, respectively between the prisms 43 and 41 and 44 and 42, respectively, are silvered by one half so as to provide the necessary reflection.

Each of the lower telescope systems of the apparatus has on each side fixedly provided dispersive lenses 47 and 47', respectively, and converging lenses 48 and 49, respectively, which latter allow of being displaced perpendicularly to the rangefinder base. The lenses have oppositely equal local widths. In order to permit of being displaced, the lenses 48, 49 are connected with racks 50 and 51 which are moved by toothed wheels 52, 53 coupled with bevel wheels 54, 55. These bevel wheels 54 and 55 are connected with each other by means of a third bevel wheel 56 in such a manner that they form a planet gearing. The axis of the planet wheel 56 is mounted in a toothed ring 58, which is turned about its axis by means of a toothed wheel 57, and has a milled head 59. By means of a milled head 60 also the toothed wheel 57 allows of being manually turned. The displaceable lenses 48, 49 whereof the superfluous sectors above and below are cut off represent a well-known means for causing a variable lateral deflection of rays. When in central position, in which their optical axes coincides with that of the lenses 47, 47', the said lenses 48, 49 do not affect the course of the path of the imaging rays. The apparatus is completed by a compensator 61 placed in front of the two objective prisms 26 and 28.

When using the instrument, the two lenses 48 and 49 serve the same purpose as the compensators 23 and 24 of the first example. Displacements in the same sense of these lenses 48, 49 are obtained when, by means of the milled head 60, the ring 58 is turned together with the axis of the planet wheel 56. These displacements effect opposite deviations of the axes of the imaging ray pencil systems, and consequently, alterations in the apparent distance of the image in the lower half of the field of view. However, displacements in opposite sense of the lenses 48, 49, obtained by turning the planet wheel 56 through the agency of the milled head 59, effect alterations in the same sense of the deviations of the axes of the imaging ray pencil systems and, consequently, lateral displacements of the image of the lower half of the field of view. Accordingly, the turning movement of the milled head 59 is a measure for the lateral displacement $$\frac{\eta+\xi}{2}$$

of the image (cf. Fig. 1), and the turning movement of the milled head 60 a measure for the difference in the distances E and D. The effect of the movements caused by the milled heads 59 and 60 would be a reverse one in case the two toothed wheels 52 and 53 would mesh with the racks 50 and 51 from different sides, one from below for example, or when instead of a converging lens a dispersive one were made displaceable.

The compensator 61, which acts upon the two systems of imaging ray pencils of the right half of the instrument, is used in the well-known manner for ascertaining the distances E and D or at least one of them, for which purpose fixed measuring marks (not represented in the drawings) must be provided in the field of view. This range finding device corresponds to the one intimated in connection with the first example by the mark plates 7, 8 and the reading device 13, 14.

The instrument representing the second example allows of being further improved when regard is had to the relation (8) $\log (\eta - \xi) = \log (E-D) + \log b - 2 \log D$ which is obtained by logarithmizing the Equation (7). By providing the milled head 60 with a division graduated in the well-known manner to represent the logarithms of the angular difference $\eta - \xi$ and the said division with an adjustable index having the logarithms of the range values marked on a double scale, the sought range difference $E-D$ of the aiming points A and B can be read off direct, owing to the fact that $\log b$ is unvariable. If it is desired to read the range without the necessity of previously adjusting the said divisions by hand, these divisions may be coupled in the well-known manner to the corresponding measuring devices of the instrument by means of logarithmic cam discs.

The third example (Figs. 7 and 8) shows an instrument consisting of two rangefinders, in which the field of view of the eyepiece appears divided by a perpendicular separating line and wherein one of the spatial images is laterally inverted. The apparatus is accordingly equipped with two pairs of objective prisms 62, 63, and 64, 65, whereof the former have a triangular and the latter a pentagonal cross section, two objective prisms 66, 67, and 68, 69, and two two-lens eyepieces 70, 71 which allow of being looked in from above. These eyepieces are placed behind prism bodies whereof each consists of a prism of trapeziform cross section, 72 and 73, respectively, a triangular prism 74 and 75, respectively, having a cemented surface, 76 and 77, respectively, of which triangular prisms the right and, respectively, the left half is silvered so as to afford reflection, and one triangular prism 78 and 79, respectively. The instrument may be equipped with the measuring devices as described in connection with the first and second examples and used in a corresponding manner. However, by replacing the prisms 62, 63 by prisms of pentagonal cross section both spatial images are made to appear laterally correct.

In the fourth example (Figs. 9 to 12) the two objective prisms 80, 81 of pantagonal cross section have two pairs of objectives 82, 83 and 84, 85. For viewing the aiming point images produced by the objective serve two two-lens eyepieces 86, 87 which also permit of being looked in from above. In front of the eyepieces 86, 87 are two prism bodies that respectively consist of prisms of pentagonal cross section, 88 and 89, having roof surfaces 90, 91, of triangular prisms 92, 93, of triangular prisms 94, 95, and of prisms 96, 97 of trapeziform cross section. The cemented surfaces 98, 99 between the trapeziform prisms 96, 97 and the triangular prisms 94, 95 are half silvered so that the field of view of the eyepiece appears divided by a horizontal line (cf. Fig. 12). The trapeziform prism 97 of the prism body belonging to the eyepiece 87 on the right side consists of two parts whereof the cemented surface 100, which lies in the image plane of the eyepiece, is provided with an angular graduation 101. In front of the objective 83 is inserted in the path of the imaging rays a pair of wedge-shaped prisms 102 which allow of being turned and serve as a compensator.

The rotatable pair of wedge-shaped prisms serve for removing and measuring the apparent difference in the distances of the spatial images of the two aiming points A and B, which in the example are assumed to be a vessel and a column of water raised by an exploding projectile. In the field of view the target A is vertically inverted and the aim B vertically correct. The image produced by the objectives 84, 85 is laterally inverted, that produced by the objectives 82, 83 laterally correct. By leading the imaging rays coming from the right objective prism 81 to the prism 88 and the imaging rays coming from the objective prism 80 to the prism 89, that is, by making the pencils of imaging rays cross each other in the instrument, the formation of pseudoscopic images is avoided. The angular graduation 101 serves for easily finding the difference in the lateral directions of the two aiming points A and B. By choosing the different prism systems in the manner as stated above, it is attained that the images of the two aiming points A and B can be laterally displaced towards each other merely by turning the instrument on a perpendicular line vertically intersecting the rangefinder base. When aiming with the instrument at the medial plane between the aiming points A and B, the images of A and B appear exactly one above the other when they have the same distance from the instrument and approximately one above the other and displaced in the same sense out of the field of view by half the angular value of their range difference when they are at different distances from the instrument. Accordingly, by means of the corresponding angular graduation 101 the difference in the lateral directions of the two aiming points can be found at once as soon as the point zero of the said graduation coincides with the centre of the field of view, viz. with the optical axis of the eyepiece.

In correspondence with the conditions referred to in the beginning of the present specification, the new instrument may have also a great number of other constructional forms.

I claim:

1. A stereoscopic rangefinder for finding the range difference of two aiming points, comprising four objective prisms whereof two each are close to each other, two ray converging prisms adapted to converge the ray pencils coming from two each of the two objective prisms arranged close to each other, two eyepieces provided behind these ray converging prisms, objectives inserted in the path of the rays, and optical means inserted in the path of the rays and adapted to give the two spatial images formed by the rays coming from the four objective prisms the same apparent distance.

2. A stereoscopic rangefinder for finding the range difference of two aiming points, comprising four objective prisms whereof two each are close to each other, two ray converging prisms adapted to converge the ray pencils coming from two each of the two objective prisms arranged close to each other, two eyepieces provided behind these rays converging prisms, objectives inserted in the path of the rays, and at least two deviating means of variable effect inserted in the path of two of the ray pencils coming from the objective prisms.

3. A stereoscopic rangefinder for finding the range difference of two aiming points, comprising four objective prisms whereof two each are close to each other, four objectives each disposed behind one of the four objective prisms, two ray converging prisms of which each is adapted to pass on of each of the images produced by two each of the objectives a half image, two eyepieces provided behind these ray converging prisms and at least two deviating means of variable effect inserted in the path of two of the ray pencils coming from the objective prisms.

4. A stereoscopic rangefinder for finding the range difference of two aiming points, comprising four objective prisms whereof two each are close to each other, two ray converging prisms adapted to converge the ray pencils coming from two each of the two objective prisms arranged close to each other, two eye-pieces provided behind these ray converging prisms, objectives inserted in the path of the rays, optical means inserted in the path of the rays and adapted to give the two spatial images formed by the rays coming from the four objective prisms the same apparent distance, and a device for measuring the angle which corresponds to the difference in the directions of the two aiming points.

5. A stereoscopic rangefinder for finding the range difference of two aiming points, comprising four objective prisms whereof two each are close to each other, four objectives each disposed behind one of the four objective prisms, two ray converging prisms of which each is adapted to pass on of each of the images produced by two each of the objectives a half image, two each of the half images touching each other on a horizontal separating line, of the two pairs of half images lying above and below the two separating lines the one consisting of two laterally correct images and the other of the two half images that are inverted at least in the direction of the separating lines, two eyepieces disposed behind the ray converging prisms, an angular graduation provided in the field of view of one of the two eyepieces and having its point zero in the optical axis. and at least two deviating means of variable effect inserted in the path of two of the ray pencils coming from the objective prisms.

OTTO EPPENSTEIN.